Figure 1:
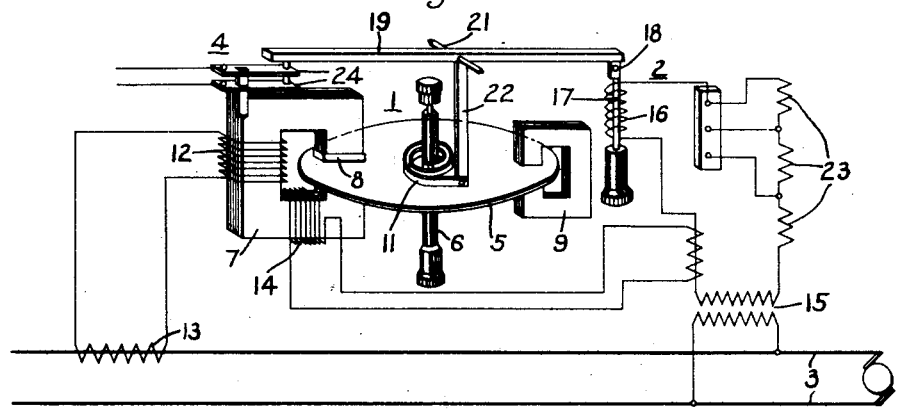

Oct. 8, 1929.                L. N. CRICHTON                1,730,877

ELECTRICAL PROTECTIVE DEVICE

Filed April 29, 1924

WITNESSES:
A. J. Butler.
Lester L. Audlong

INVENTOR
Leslie N. Crichton.
BY
Wesley G. Carr
ATTORNEY

Patented Oct. 8, 1929

1,730,877

UNITED STATES PATENT OFFICE

LESLIE N. CRICHTON, OF WILKINSBURG, PENNSYLVANIA, ASSIGNOR TO WESTINGHOUSE ELECTRIC & MANUFACTURING COMPANY, A CORPORATION OF PENNSYLVANIA

ELECTRICAL PROTECTIVE DEVICE

Application filed April 29, 1924. Serial No. 709,753.

My invention relates to electrical protective devices and more particularly to induction relays.

One object of my invention is to provide an electrical protective device that shall be responsive to the drop in potential in a protected circuit.

Another object of my invention is to provide an electrical protective device that shall operate upon the occurrence of an abnormal condition in a circuit regardless of the generator capacity of the circuit.

A further object of my invention is to provide a relay of the voltage-restrained type that shall have means for causing the same to operate correctly irrespective of the capacity of the generators supplying energy to the circuit.

In the operation of electrical transmission systems, it frequently occurs that the capacity or number of generators connected to the system is varied according to the time of day. Under such circumstances, it is frequently found that a fault may occur upon the transmission line during the night, for instance, when the generator capacity is relatively small, without causing the flow of a greater current than the full-load current during the day when the source of electromotive force of greater capacity is connected to the system.

Under such conditions, the best indication of the occurrence of a fault is given by the drop in the potential on the transmission line. If mechanical devices are employed to control or adjust the protective device in accordance with the capacity of the connected source of electromotive force, it is obvious that these mechanical adjustments must be varied with each change in the capacity of the connected generators or else the mechanical adjustments must be given a sufficiently high or low value, as the case may be, in order to take care of the heaviest operating load that the distribution circuit is intended to carry.

It is the object of the present invention to eliminate such mechanical adjustments by providing compensation whereby the protective device will operate entirely automatically substantially in accordance with the drop in potential independently of the variations in the fault current that result from changes in generator capacity.

The present invention may be applied to the structure shown and described in my copending application, Serial No. 641,701, filed May 26, 1923, and which is assigned to the Westinghouse Electric & Manufacturing Company. The structure shown in my copending application is intended to so operate upon the occurrence of an overload in the distribution circuit that the circuit interrupter nearest the fault will be opened, and the other circuit interrupters are operated in accordance with their proximity to the source of trouble.

Figure 2:
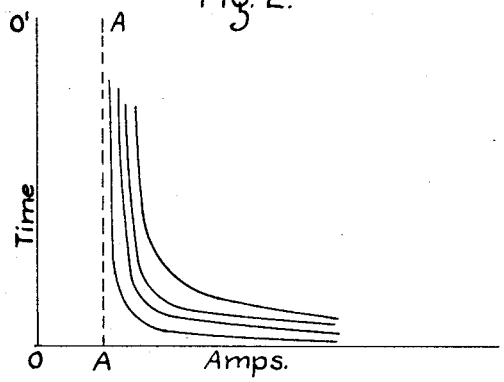
Figure 3:
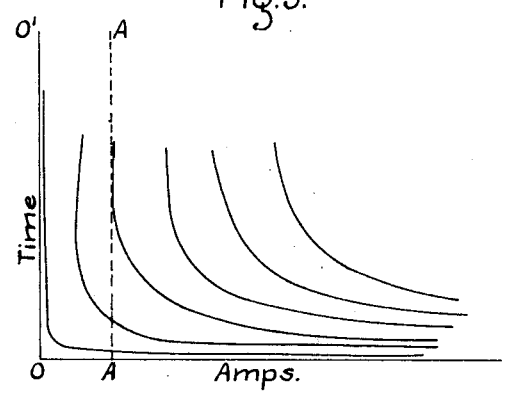

In the accompanying drawings,

Figure 1 is a diagrammatic view of circuits and apparatus embodying my invention, Fig. 2 is a view showing a plurality of characteristic curves of a relay having a mechanical adjustment, and Fig. 3 is a similar view showing the same characteristic curves in a relay that is independent of mechanical adjustments and depends upon the drop in potential in the protected circuit to control its operation.

My invention comprises, in general, when applied to a relay of the impedance type, an induction relay 1 that operates in opposition to a restraining electromagnet 2, that is energized in accordance with the potential in the associated distribution circuit 3, for controlling a switch 4 that is connected to any suitable device, such as a circuit interrupter (not shown).

The induction relay 1 comprises a disc armature 5 of non-magnetic material that is carried by a pivoted shaft 6. An electromagnet 7, having a shading coil 8, supplies energy to the disc 5 to actuate the same against the action of a damping magnet 9 and a spring 11. The electromagnet 7 comprises a coil 12 that is connected to a current transformer 13 in the circuit 3. A second coil 14, that is energized from a potential transformer 15 connected to the circuit 3, constitutes a second winding for the electromagnet 7. The coils 12 and 14 are so wound that they oppose each other and the coil 14 restrains the armature member 5 when the current traversing the circuit 3 is below a predetermined value at normal voltage.

The electromagnet 2 comprises a coil 16, that is energized from the potential transformer 15, and an armature member 17. The armature member 17 is attached, as at 18, to a lever 19 pivotally mounted, as at 21. The lever 19 is connected by an arm 22 to one end of the spring 11. Under normal conditions of potential in the circuit 3, the torque exerted by the electromagnet 2 on the lever 19 is sufficient to counterbalance the force exerted thereon by the spring 11 in response to the influence of the electromagnet 7 upon the armature 5. Suitable calibrating resistors 23 are placed in circuit with the coil 16 and the potential transformer 15 for adjusting the potential setting of the relay.

The switch 4 comprises a pair of resilient contact members 24 that are normally out of engagement with one another but that are brought into engagement by the lever 19 under conditions hereinafter described.

When the current traversing the circuit 3 is below a predetermined value and the potential of the circuit is normal, the torque on the armature 5 developed by the coil 12 is neutralized by the effect of the potential coil 14 and the armature 5 remains inactive by reason of the effect of the coil 14 and the damping magnet 9. However, if the current traversing the circuit 3 increases beyond a predetermined value and the potential drops on account of a fault, the magnetic effect of the coil 12 overcomes that of the coil 14 and the armature 5 tends to rotate in a counter-clockwise direction.

The movement of the armature 5 is transmitted through the spring 11 and the arm 22 to the lever 19 and tends to turn the latter in a counter-clockwise direction about the pivot 21 in opposition to the torque of the electromagnet 2. In the proximity of the fault, the potential of the circuit and consequently the degree of energization of the restraining coil 17 is a minimum. The result is that the coil 12 is able to overcome the opposition of the coil 14 and the electromagnet 2 with the result that the switch 4 is closed by the counter-clockwise movement of the lever 19 and its engagement with the contact members 24, and the time of operation depends upon the distance from the fault. Upon the closing of the contact members 24, a circuit interrupter or other protective device (not shown) is actuated for protecting the circuit 3.

Upon the restoration of normal potential on the circuit 3, the electromagnet 2 and the coil 14 become sufficiently energized to turn lever 19 out of engagement with the contact members 24. At the same time, the armature 5 is returned to its original position by the action of spring 11.

Since the falling off of the potential impressed upon the supply circuit is an indication of the occurrence of a fault, it becomes obvious that the relay described will protect a source of electromotive force against a fault on the system. Furthermore, it operates without regard to the value of the load current traversing the circuit under normal conditions.

The advantage of my improved construction will be better understood by a comparison of the characteristic curves shown in Figs. 2 and 3. Relays in general are designed to operate with an inverse time element such as are indicated by curves shown in Fig. 2. The broken line A—A in Fig. 2 indicates the number of amperes that are necessary to overcome the resistance of mechanical adjustments, such as springs found in most induction relays, such a characteristic ordinarily being necessary to prevent the relay from operating upon normal load current. It is obvious that if the capacity of the source of electromotive force or generator connected to the circuit is less than the value OA, that the circuit may be seriously injured under conditions of overload before the relay operates on a value in excess of that indicated by the line OA.

Referring to Fig. 3, it is found, that by reason of the compensation for load current on the relay described, the characteristic curves thereof occupy that area designated as OAAO'. This means that irrespective of the load on the circuit 3, a falling off in potential for any reason permits the immediate operation of the protective device without regard to the value of the current OA, which may be the normal peak-load current.

From an operating point of view, the foregoing objects are desirable in distributing systems where there is a large motor and lighting load throughout the day and only a small street lighting load throughout the night. In such systems, it is the custom to permit the larger generators to become idle throughout the night and substitute therefor a generator of relatively small capacity. If a fault occurs in the system when such a generator is connected thereto its capacity will be exceeded before the relays operate, if they are mechanically adjusted for the heavy load so as to remain inactive until currents exceed the value OA in Fig. 2. With my device, by reason of the fact that a voltage coil is used to control the same, it may be made automatically adjustable for various loads and thus the connected generator can be protected under all conditions.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with an electrical circuit to be protected, of an impedance relay associated therewith, including a rotatable member, an electromagnet for actuating said rotatable member in accordance with the current traversing said circuit, an electromagnetically-controlled device responsive to the potential of said circuit for retarding the movement of said rotatable member, and a restraining coil responsive to the potential of said circuit for mechanically opposing the action of said electromagnet in accordance with the potential of said circuit.

2. The combination with an electrical circuit to be protected, of a protective relay of the impedance type associated therewith comprising a pivoted contact member, a rotatable member resiliently connected thereto, an electro-magnet for actuating said rotatable member in accordance with a current traversing said circuit, means energized in accordance with the potential of said circuit for retarding the movement of said rotatable member and means responsive to the potential of said circuit associated with said contact member to oppose the action of said rotatable member.

3. An impedance relay for an alternating current circuit comprising a pivoted contact arm, means responsive to the voltage of said circuit for normally biasing said arm to inoperative position, means for biasing said arm to operative position in accordance with the current traversing said circuit, and means cooperating with said latter means for permitting the operation of said relay in accordance with the voltage of said circuit and independently of the magnitude of said current.

4. An impedance relay for protecting an alternating current circuit comprising a pivoted contact arm, means biasing said arm to inoperative position in accordance with the voltage of said circuit, means biasing said arm to operative position in accordance with the current traversing said circuit, and means energized in accordance with the voltage of said circuit for opposing said latter means whereby said relay is operable independently of the magnitude of the current traversing said circuit.

5. In an alternating current circuit, the combination with a relay of the impedance type comprising a pivoted contact arm, normally biased to inoperative position in accordance with the voltage of said circuit, an induction disc rotatable in accordance with the magnitude of the current traversing said circuit, and a resilient connection between said arm and disc whereby said arm is biased to operative position in accordance with the rotation of said disc, of a restraining means energized in accordance with the voltage of said circuit associated with said disc whereby said relay is operable in accordance with the voltage of said circuit and independent of the magnitude of current.

In testimony whereof, I have hereunto subscribed my name this 24th day of April, 1924.

LESLIE N. CRICHTON.